Patented Oct. 24, 1944

2,361,072

UNITED STATES PATENT OFFICE 2,361,072

MANUFACTURE OF TRICHLORETHYLENE

William H. Vining, Niagara Falls, N. Y., assignor to E. I. du Pont de Nemours & Company, Wilmington, Del., a corporation of Delaware No Drawing. Application February 9, 1942, Serial No. 430,163

6 Claims. (Cl. 260—654)

This invention relates to a method for preparing trichlorethylene and, more particularly, to the manufacture of trichlorethylene by the catalytic dissociation of tetrachlorethane into trichlorethylene and hydrogen chloride.

For a number of years trichlorethylene has been manufactured on a large scale by the reaction of tetrachlorethane with an alkaline reagent, such as lime, which removes one molecule of hydrogen chloride from the tetrachlorethane molecule, thereby producing trichlorethylene together with the chloride salt of the alkali used, as represented by the following equation:

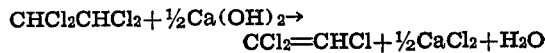

$$CHCl_2CHCl_2 + \tfrac{1}{2}Ca(OH)_2 \rightarrow CCl_2=CHCl + \tfrac{1}{2}CaCl_2 + H_2O$$

The principal disadvantages of this process are, first, the cost of the lime or other alkaline reagent employed, and secondly, the fact that the hydrogen chloride split off from the tetrachlorethane is not recoverable in any useful form.

To obviate these disadvantages and to obtain hydrogen chloride in a useful form as a by-product of the reaction, it has been proposed to prepare trichlorethylene by passing tetrachlorethane, in the vapor phase, over a dehydrochlorination catalyst such as, for example, barium chloride, supported on a porous carrier such as active charcoal. This procedure has the advantage of yielding hydrogen chloride as a valuable by-product but it also has a disadvantage which is inherent in most catalytic processes of this kind. This disadvantage lies in the fact that the activity of the known dehydrohalogenation catalysts can be maintained only for limited periods of time. Consequently, the cost of the catalyst becomes an important item in the overall manufacturing cost. Moreover, the necessity for frequently changing the catalyst interrupts manufacturing operations, increases the labor cost, and decreases the productive capacity of the manufacturing equipment.

It is, accordingly, an object of the present invention to provide an improved process for the manufacture of trichlorethylene from tetrachlorethane. A further object is to provide a process for the dehydrochlorination of tetrachlorethane wherein the hydrogen chloride may be economically recovered in a useful form. A still further object is to provide a catalytic method for the dehydrochlorination of tetrachlorethane wherein a long catalyst life is attained and wherein the catalyst may be replenished without interrupting manufacturing operations. Other objects and advantages of the invention will be apparent from the ensuing disclosure.

The foregoing and related objects are attained in accordance with the present invention by a method which comprises contacting tetrachlorethane with a nitrogen base, or a salt thereof, at a temperature sufficient to cause dissociation of the tetrachlorethane into trichlorethylene and hydrogen chloride.

It has been known heretofore that nitrogen bases will react with tetrachlorethane at elevated temperatures to form the hydrogen chloride salts of said bases, and trichlorethylene. However, this reaction is of only theoretical interest, inasmuch as it would be economically prohibitive to utilize nitrogen bases for this purpose rather than the much less expensive alkalis, such as lime. However, I have now discovered that when a nitrogen base is reacted with tetrachlorethane to form the salt of the base, the latter functions as a catalyst for the further dissociation of tetrachlorethane to trichlorethylene and hydrogen chloride. I have found that a wide variety of nitrogen bases and their salts are effective catalysts for this reaction. Among these which have been found to be effective are tetraethylammonium chloride, triethylamine, ethylquinolinium chloride, tributylamine, trimethylamine hydrochloride, triamylamine, quinoline, phenylhydrazine hydrochloride, cyclohexyl dimethyl amine, aniline hydrochloride, piperidine, ethylamine hydrochloride, diortho-tolyl guanidine, ammonium chloride, diethylamine, semicarbazide hydrochloride, naphthylamine hydrochloride, and morpholine. As a practical matter it makes little difference whether the free nitrogen base is reacted with the tetrachlorethane or whether the hydrogen chloride salt is employed, inasmuch as the free base will intially react, at least to some extent, with the first portion of the hydrogen chloride split off from the tetrachlorethane to form the salt.

The reaction may be carried out merely by adding an effective amount of the nitrogen base, or salt thereof, to tetrachlorethane, heating the mixture to reaction temperature and then distilling off hydrogen chloride and trichlorethylene. In commercial operation of the process, however, it is preferable to operate in a continuous manner. Thus, the reaction chamber may be initially charged with a mixture of tetrachlorethane and nitrogen base catalyst, and hydrogen chloride and trichlorethylene continuously distilled therefrom, preferably through a fractionating column, while tetrachlorethane is continuously introduced into the reaction chamber. The vapors leaving the fractionating column are passed into a condenser, where the trichlorethylene (which will contain greater or lesser amounts of tetrachlorethane, depending upon the efficiency of the fractionating column) is condensed out. The uncondensed hydrogen chloride may be recovered by any of the conventional procedures; for example, it may be recovered directly in the anhydrous state, it may be absorbed in water, or it may be conducted directly to other manufacturing operations utilizing hydrogen chloride. In some cases it is advantageous to scrub the hydrogen chloride with the tetrachlorethane entering the reaction system in order to remove residual traces of trichlorethylene therefrom. The crude trichlorethylene obtained from the condenser may be purified by fractional distillation and the tetrachlorethane recovered therefrom may be recycled in the process.

The concentration of nitrogen base catalyst in the reaction mixture should usually be upward of 1% by weight and I prefer to use catalyst concentrations considerably in excess of this amount, inasmuch as the rate of reaction is roughly proportional to the catalyst concentration for any particular catalyst. The upper limit of catalyst concentration is governed solely by the solubility of the nitrogen base salt in tetrachlorethane at the reaction temperature. Generally I prefer to maintain in the reaction medium a catalyst concentration in the range of 10–40% by weight. While the dehydrochlorination reaction takes place to some extent at relatively low temperatures, I prefer to carry out the reaction at temperatures equivalent to the boiling point of the equilibrium mixture of tetrachlorethane, trichlorethylene and nitrogen base catalyst comprising the reaction medium. This equilibrium boiling point will, of course, vary considerably depending upon the particular catalyst used and the concentration thereof. In general, it is preferable to use nitrogen base catalysts which have relatively high boiling points and to use them in concentrations sufficient to effect a considerable elevation of the boiling point of the reaction mixture. In certain cases, particularly where the solubility of the nitrogen base catalyst is somewhat limited, it is desirable to increase the boiling point of the reaction medium by adding thereto an inert diluent of high boiling point as, for example, diphenyl, diphenyl oxide or the like. In general, I prefer to control the reactants and reaction conditions so that the reaction temperature is in the range of 100–250° C. and more preferably from 150–200° C.

The more detailed practice of the invention is illustrated by the following examples.

*Example I*

An apparatus was set up consisting of a 5 liter, three-necked flask, equipped with a separatory funnel, with thermometers placed both above and below the normal liquid level, and with an outlet leading through a condenser to a receiver and thence to water scrubbers. Into the flask were charged 202 grams of triethylamine, 1680 grams of tetrachlorethane and 136 grams of "Dowtherm A" (a mixture of diphenyl and diphenyl oxide). The reaction mixture was heated to the boiling point (approximately 160° C.) and heating continued at a rate sufficient to maintain this temperature. The distillate was condensed and run into the receiver, while the uncondensed hydrogen chloride passed into the water scrubber. The results obtained by this procedure may be summarized as follows:

| | | |
|---|---|---|
| Duration of run | hours | 202.5 |
| Total tetrachlorethane | grams | 24,269.0 |
| Total distillate | do | 18,082.3 |
| Trichlorethylene contained in distillate | grams | 13,815.0 |
| Hydrogen chloride recovered | do | 4,179.7 |
| Residue | do | 1,571.0 |

The residue consisted essentially of tetrachlorethane, trichlorethylene and triethylamine hydrochloride. The distillate consisted essentially of trichlorethylene and unconverted tetrachlorethane; upon rectification of the mixture a good grade of trichlorethylene was obtained while the tetrachlorethane was suitable for recycling in the process.

*Example II*

Into the reaction chamber of the same apparatus described in Example I there was charged 2,000 grams of tetrachlorethane and 645 grams of quinoline. The reaction mixture was heated to a temperature of 160° C. and the distillation carried out with continuous replenishment of the tetrachlorethane in the same manner as described in Example I. Results of this run are as follows:

| | | |
|---|---|---|
| Duration of the run | hours | 200.6 |
| Total tetrachlorethane added | grams | 36,646.8 |
| Weight of distillate | do | 29,157.1 |
| Weight of hydrogen chloride recovered | grams | 6,239.7 |
| Trichlorethylene contained in distillate | grams | 21,460.0 |
| Residue | do | 1,076.0 |

As in Example I, the distillate consisted essentially of trichlorethylene and tetrachlorethane while the residue in the reaction chamber consisted essentially of tetrachlorethane, trichlorethylene, and quinoline hydrochloride.

The nitrogen base catalysts appear to retain their activity practically indefinitely. However, depending upon the volatility of the particular catalyst employed, some of the catalyst may be lost by distillation. In this case it is a very simple matter to maintain the desired catalyst concentration in the reaction chamber by introducing small amounts of the catalyst from time to time which, of course, can be done without interrupting or interfering in any way with the manufacturing process.

As has been pointed out above, both the free nitrogen bases and their salts are active catalysts for the reaction. However, as the reaction proceeds the amines initially present are, of course, at least partially converted to the hydrochlorides so that the active catalyst present when equilibrium conditions are obtained is either the nitrogen base hydrochloride or perhaps an equilibrium mixture of the free base and the hydrochloride. For the sake of brevity, these catalysts are referred to in the appended claims merely as nitrogen bases, it being understood that this term is comprehensive enough to include salts of these bases, as well as the free bases.

The tetrachlorethane utilized in the process may be any of the regular commercial grades and the impurities usually occurring therein do not appear to have any deleterious effect upon the operation of the process. Thus, for example, pentachlorethane, which is usually present to the extent of a few per cent in tetrachlorethane prepared by the chlorination of acetylene, is converted to perchlorethylene by the action of the nitrogen base catalyst. The boiling points of perchlorethylene and trichlorethylene are sufficiently far apart so that the separation of these two components in the crude reaction product is readily effected by simple fractional distillation.

While the process of the invention has been described with considerable particularity hereinabove, it is to be understood that these specific embodiments of the invention are illustrative only, and that the invention embraces all such modifications, variations and equivalents as fall within the scope of the appended claims.

I claim:

1. A method for the preparation of trichlorethylene which comprises continuously introducing tetrachlorethane into a reaction chamber containing the hydrogen chloride salt of an organic nitrogen base as a catalyst and continuously distilling therefrom trichlorethylene and hydrogen chloride.

2. A method for the preparation of trichlorethylene which comprises continuously introducing tetrachlorethane into a reaction chamber containing triethylamine hydrochloride as a catalyst and continuously distilling therefrom trichlorethylene and hydrogen chloride.

3. A method for the preparation of trichlorethylene which comprises continuously introducing tetrachlorethane into a reaction chamber containing quinoline hydrochloride as a catalyst and continuously distilling therefrom trichlorethylene and hydrogen chloride.

4. A method for the preparation of trichlorethylene which comprises continuously introducing tetrachlorethane into a reaction chamber containing the hydrogen chloride salt of tetraethyl ammonium chloride as a catalyst and continuously distilling therefrom trichlorethylene and hydrogen chloride.

5. The method of preparing trichlorethylene set forth in claim 1, wherein an inert high-boiling liquid is added to the reaction mixture to increase the boiling point thereof.

6. The method of preparing trichlorethylene set forth in claim 2, wherein an inert high-boiling liquid is added to the reaction mixture to increase the boiling point thereof.

WILLIAM H. VINING.